United States Patent
Al-Regib et al.

(10) Patent No.: US 9,103,436 B2
(45) Date of Patent: Aug. 11, 2015

(54) BACKUP SYSTEM FOR ELECTRONIC TRANSMISSION RANGE SHIFTING

(71) Applicant: FORD GLOBAL TECHNOLOGIES, LLC, Dearborn, MI (US)

(72) Inventors: Emad Al-Regib, Westland, MI (US); Todd C. Spaulding, Ann Arbor, MI (US); Mark E. Zyskowski, Dearborn, MI (US); Brian J. Deurloo, Howell, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 105 days.

(21) Appl. No.: 14/147,701

(22) Filed: Jan. 6, 2014

(65) Prior Publication Data

US 2015/0192202 A1    Jul. 9, 2015

(51) Int. Cl.
*B60K 17/00* (2006.01)
*F16H 61/12* (2010.01)
*F16H 61/32* (2006.01)
*B60K 20/02* (2006.01)

(52) U.S. Cl.
CPC ............... *F16H 61/12* (2013.01); *B60K 20/02* (2013.01); *F16H 61/32* (2013.01); *B60K 2741/085* (2013.01); *F16H 2061/126* (2013.01); *F16H 2061/1268* (2013.01); *F16H 2061/1292* (2013.01); *F16H 2061/326* (2013.01)

(58) Field of Classification Search
CPC . F16H 61/12; F16H 61/32; F16H 2061/1268; F16H 2061/126; F16H 2061/122; F16H 2061/1292; F16H 2061/326; B60K 2741/085; B60K 20/02
See application file for complete search history.

(56) References Cited

U.S. PATENT DOCUMENTS

| | | | | |
|---|---|---|---|---|
| 4,962,680 | A | * | 10/1990 | Kirstein .................... 477/32 |
| 8,515,635 | B2 | | 8/2013 | Spaulding et al. |
| 8,560,193 | B2 | | 10/2013 | Krishnaswami et al. |
| 2007/0182247 | A1 | | 8/2007 | Kim et al. |
| 2012/0078478 | A1 | | 3/2012 | Spaulding et al. |
| 2012/0131993 | A1 | | 5/2012 | Deurloo et al. |
| 2013/0151096 | A1 | | 6/2013 | Fyie et al. |

* cited by examiner

*Primary Examiner* — Faye M Fleming
(74) *Attorney, Agent, or Firm* — James Dottavio; MacMillan, Sobanski & Todd, LLC

(57) ABSTRACT

Emergency shifting is performed in a shift-by-wire (SBW) vehicle during a power failure of a main electrical supply that includes a battery. A shift actuator is configured to mechanically couple to the transmission in order to execute shift events between a plurality of shift positions (including park and neutral) using the main voltage from the main supply during normal conditions. A human-powered generator is provided for converting a manually-imparted motion to an electrical output during the power failure. A storage device (e.g., capacitor) receives the electrical output to store a power reserve to apply to the shift actuator to execute an emergency shift event in the absence of main power in response to a manual command. The generator and storage device are configured such that a maximum power reserve stored from the generator can achieve only one emergency shift event at a time.

11 Claims, 2 Drawing Sheets

BACKUP SYSTEM FOR ELECTRONIC TRANSMISSION RANGE SHIFTING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicles using shift-by-wire transmission controls, and, more specifically, to a backup system for executing a transmission shift during times that a main electrical system fails to provide power for shifting.

In a conventional automatic transmission system for a motor vehicle, a direct mechanical linkage connects a driver-operated gear shift lever through a cable to a gear shift mechanism on the transmission. In a shift-by-wire system, this direct linkage is separated and an electronic system that includes solenoids or motors produces the intended movement of the gear shift mechanism.

Shift-by-wire systems provide numerous advantages such as occupying reduced space in the passenger cabin and enabling advanced functionality such as Auto Park. With shift-by-wire technology, however, a potential loss of main (e.g., battery) power creates unique failure management situations related to the park system of the vehicle. For example, loss of battery power can result in the inability to shift the transmission as desired whenever the vehicle may be disabled and without electrical power, e.g., shifting into park to prevent vehicle movement or into neutral for vehicle towing.

As shown in commonly assigned U.S. Pat. No. 8,560,193 to Krishnaswami et al, a capacitor bank may be provided within a transmission range control module (TRCM) which is continuously charged during normal electrical system operation to maintain a reserve power to allow a shifting actuation immediately after the onset of a power failure. Thus, as the power failure occurs, the shift-by-wire system may automatically execute some desired shift event according to the circumstances of the failure. Whether or not the reserve power is used for shifting during the vehicle shutdown due to failure, the capacitor charge decays fairly rapidly (so that operation of the shift-by-wire system becomes unavailable). In order to allow subsequent shifting of the transmission range to facilitate towing and/or parking of a disabled vehicle as needed, mechanical means have been provided to allow a service operator to open the actuator and/or cable system to physically move the transmission into a desired shift range. The known mechanical means have been inconvenient, require tools, and/or cannot be easily performed by all vehicle operators.

SUMMARY OF THE INVENTION

In one aspect of the invention, a vehicle apparatus is provided for emergency shifting in a shift-by-wire (SBW) vehicle during a power failure which would prevent normal electronic shifting of the transmission. The apparatus comprises a main electrical supply including a battery to provide a main voltage. A shift actuator receives the main voltage and is configured to mechanically couple to the transmission in order to execute shift events between a plurality of shift positions, including a park position and a neutral position. A human-powered generator is provided for converting a manually-imparted motion to an electrical output. A storage device receives the electrical output to store a power reserve to apply to the shift actuator to execute an emergency shift event in the absence of main power in response to a manual command. The generator and storage device are configured such that a maximum power reserve stored from the generator can achieve only one emergency shift event at a time.

DETAILED DESCRIPTION OF PREFERRED EMBODIMENTS

Figure 1:
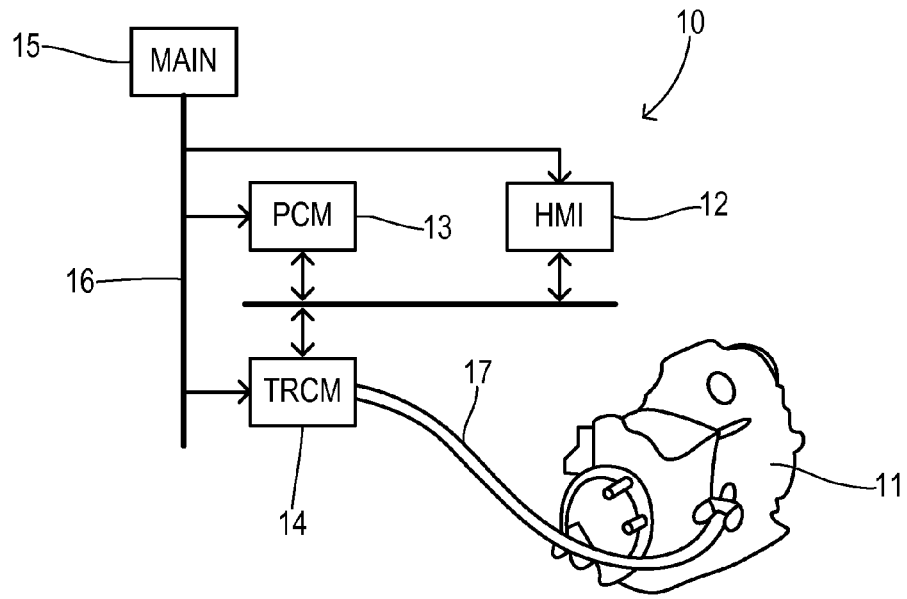
FIG. 1 is a diagram showing vehicle systems involved in a shift-by-wire function.

Referring to FIG. 1, a shift-by-wire system 10 for an automatic transmission 11 includes a human-machine interface (HMI) 12 (e.g., including a gear shift module or GSM), a powertrain control module (PCM) 13, and a transmission range control module (TRCM) 14. A main electrical system 15 includes a battery and provides main electrical power to HMI 12, PCM 13, and TRCM 14 via a main power bus 16.

The GSM of HMI 12 may be located in the passenger compartment of a vehicle where it is operated manually by the vehicle operator, who selects the desired transmission range by actuating a button corresponding to the desired range: Park (P), Reverse (R), Neutral (N), Drive (D) and Low (L). These input commands are translated by system 10 to produce signals representing the vehicle operator's requests for the desired transmission gear or range. PCM 13 is the decision maker, managing all of the interlocks for shift system 10. TRCM 14 executes the operator's requests received via PCM 13 to shift transmission 11 to the appropriate gear or range. Modules 12, 13, and 14 communicate over a communication area network (CAN).

TRCM 14 includes an electric motor (not shown) to selectably move a shift cable 17 which is connected at its other end to a manual valve or other mechanism of transmission 11. Range sensors (not shown) are typically provided on transmission 11 and TRCM 14 to inform PCM 13 of the actual positions so that appropriate operation of each shifting event can be monitored.

Figure 2:
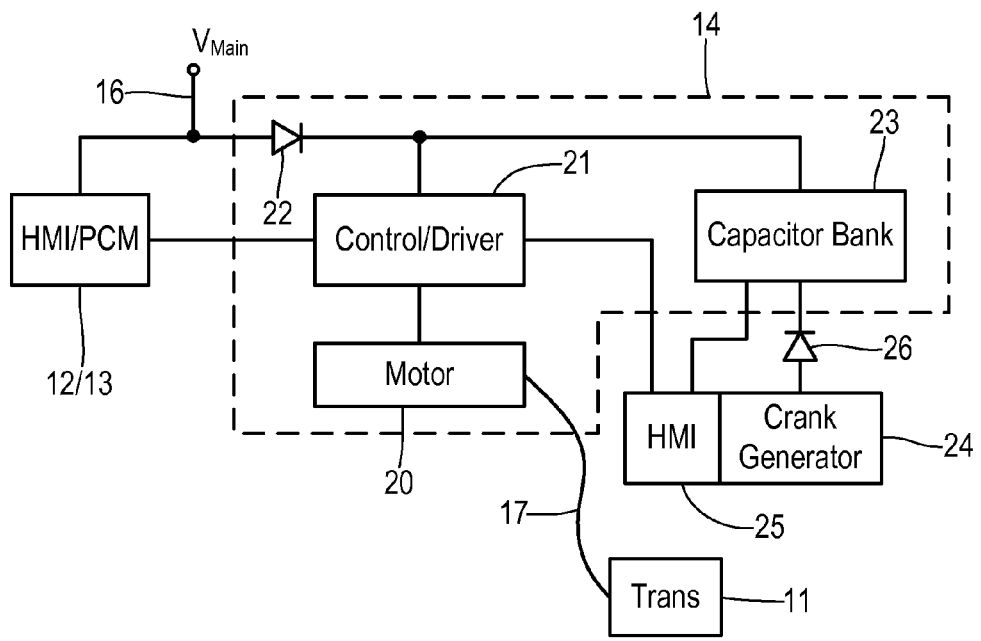
FIG. 2 is a block diagram showing one preferred embodiment of a shift-by-wire with backup system of the invention.

FIG. 2 shows a preferred embodiment of the invention wherein a human-powered electrical generator source can be activated as needed in order to create the necessary electrical charge to support an emergency shift event. TRCM 14 is shown in greater detail, including a shift actuator motor 20 and a control/driver 21. During normal conditions, main electrical power from bus 16 is transferred to control/driver 21 and motor 20 via a diode 22 which prevents emergency power generated during a main power failure from being transferred to main bus 16. Control/driver 21 operates under control of HMI 12 and PCM 13 when main power is present in order to drive motor 20 to a position corresponding to a selected transmission shift range.

As explained in U.S. Pat. No. 8,560,193, a storage device in the form of a capacitor bank 23 may be provided within TRCM 14 for being charged by main power and connected such that a stored charge can extend the operation of control/driver 21 and motor 20 at the time a power failure occurs and vehicle systems are shutting down. On the other hand, the capacitor bank shown in U.S. Pat. No. 8,560,193 cannot maintain a sufficient charge, nor hold a charge long enough to execute a shift event after the vehicle has entered a disabled state with no main power.

To address the foregoing problem, the present invention employs supplemental apparatus including a human-powered generator 24 and a supplemental HMI 25 in order to facilitate an emergency shift event into either a park position or a neutral position whenever necessary for the disabled vehicle. Crank generator 24 is human powered for converting a manually-imparted motion into an electrical output which is supplied to capacitor bank 23 via a diode 26. Crank Generator 24 may preferably be comprised of a permanent magnet generator having a hand crank (e.g., of a type commonly used in consumer flashlights and radios). HMI 25 is coupled to capacitor bank 23 for receiving emergency power generated using crank generator 24 and providing necessary commands to control/driver 21 for initiating an emergency shift event in the absence of main power. A manual command can be initiated by an operator using HMI 25 after using crank generator 24 to supply sufficient electrical energy onto capacitor bank 23. Preferably, HMI 25 can initiate only an emergency shift event which is limited to a shift into either the park position or the neutral position (since these two are the only useful shift ranges when the vehicle main electrical source is disabled).

Capacitor bank 23 is configured as a storage device receiving the electrical output from crank generator 24 to store a power reserve to apply to the TRCM shift actuator in order to be able to execute an emergency shift event in the absence of main power. Crank generator 24 and capacitor bank 23 are preferable configured such that a maximum power reserve that can be generated and stored is sufficient to achieve only one emergency shift event at a time. Once capacitor bank 23 is sufficiently charged, the user can release the stored energy to execute the emergency shift event. With that event completed, the user can again operate crank generator 24 to reestablish a sufficient power reserve in order to execute a further emergency shift event—and to repeat the process as many times as necessary.

To ensure that the power reserve has the desired capacity, the apparatus of the invention can be appropriately configured as follows. Based on the known requirements of the shift actuator motor and the associated HMI requirements, a capacitor voltage and size can be selected that meet the necessary energy storage requirements using known techniques. Based on the capacitor size and voltage requirements, an input cranking power for the human-powered generator can then be determined (e.g., in watts). Based on the power requirement, a torque requirement can be determined for the cranking generator, and then a satisfactory permanent magnet generator design can be selected accordingly.

According to one example of the invention, a capacitor bank having a target voltage of 25V and a capacitance of 44K pF is used. Since the stored energy is equal to ($\frac{1}{2} \cdot C \cdot V^2$), a stored energy in this example is equal to about 13.75 Joules. The time required to complete a shift from park to neutral, for example, may be about 450 mS. With 13.75 Joules being dissipated in 450 mS, the associated power is equal to 30.6 watts. A formula for relating input cranking power of a hand generator to the torque and rotation speed is $$P = T \cdot RPM \cdot \frac{2\pi}{60},$$

where P is power, T is torque, and RPM is the cranking speed. Assuming a typical hand cranking speed of about 20 rpm, the corresponding torque requirement for the hand generator is 14.6 N-m. Thus, a designer can select an appropriate generator device that is in a compact size and that easily provides the necessary energy for achieving only a single emergency shift event.

Figure 3:
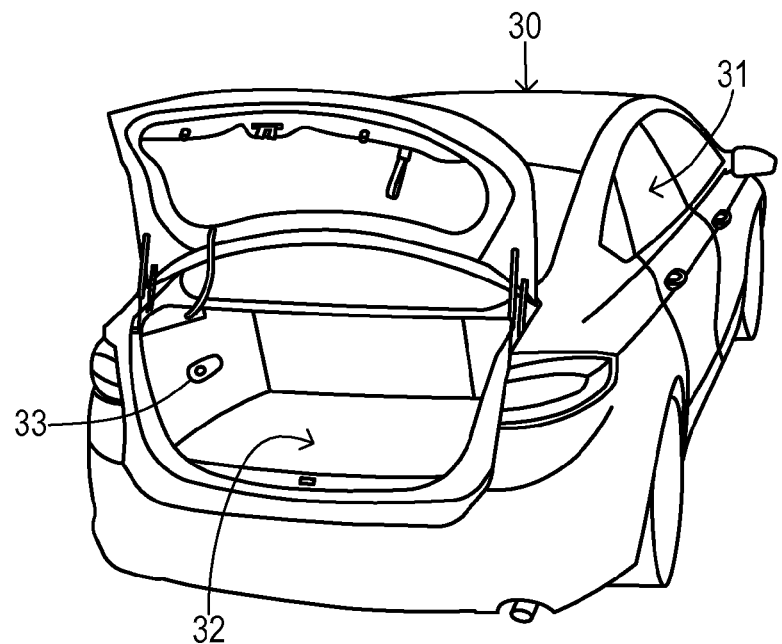
FIG. 3 is a perspective view of a vehicle showing one preferred location for a crank generator.

Preferably, the crank generator may be located outside of and/or operable from outside the passenger compartment. This will help ensure that it is used only during an appropriate emergency. As shown in FIG. 3, a vehicle 30 includes a passenger compartment 31 and a trunk compartment 32. A generator module 33 may preferably be located in trunk compartment 32, for example. Alternatively, module 33 could be located inside an engine compartment beneath a vehicle hood. It would be very convenient to co-locate module 33 with the TRCM module in order to minimize the wiring distance between the crank generator and the TRCM.

Figure 4:
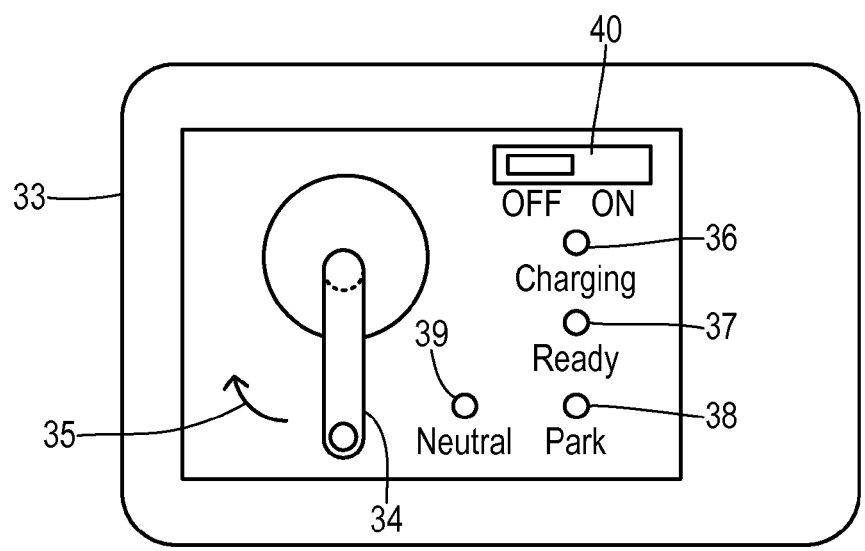
FIG. 4 is a diagram showing a crank generator module.

FIG. 4 shows one embodiment of module 33 containing the crank generator and HMI. Module 33 has a crank handle 34 for being rotated in a direction 35 in order to operate a permanent magnet generator that supplies an electrical current for charging the capacitor bank. The HMI portion may include indicator lights such as a charging-in-progress light 36 and a ready-to-shift light 37 to give user feedback of the charge status. Transmission range selector buttons 38 and 39 (e.g., push button switches) may be provided for selecting a park position or a neutral position, respectively. An on/off switch 40 may optionally be provided to help prevent operation of the generator during times that the main power source is available.

Even though the crank generator may preferably be operable only from outside the passenger compartment, it may be desirable to permit initiation of the emergency shift event itself from within the passenger compartment. In that instance, either an additional dedicated user control can be provided in the passenger cabin or power from the capacitor bank could be used to enable the gear shift module during the main power failure.

What is claimed is:

1. Apparatus for a vehicle having an electronically-shifted transmission, comprising:
    a main electrical supply including a battery providing a main voltage;
    a shift actuator receiving the main voltage and configured to mechanically couple to the transmission to execute shift events between a plurality of shift positions including a park position and a neutral position;
    a human-powered generator converting a manually-imparted motion to an electrical output; and
    a storage device receiving the electrical output to store a power reserve to apply to the shift actuator to execute an emergency shift event in the absence of main power in response to a manual command;
    wherein the generator and storage device are configured such that a maximum power reserve stored from the generator can achieve only one emergency shift event at a time.

2. The apparatus of claim 1 wherein the emergency shift event is a shift into the park position or the neutral position.

3. The apparatus of claim 1 wherein the human-powered generator is comprised of a permanent magnetic generator with a hand crank.

4. The apparatus of claim 3 wherein the vehicle includes a passenger compartment, and wherein the hand crank is configured to be operable from outside the passenger compartment.

5. The apparatus of claim 4 wherein the vehicle has a trunk, and wherein the hand crank is configured to be located in the trunk.

6. The apparatus of claim 1 further comprising an emergency interface powered from the storage device for indicating the charge status of the storage device.

7. The apparatus of claim 6 wherein the emergency interface includes a manual control element for entering the manual selection for the emergency shift event.

8. The apparatus of claim 7 wherein the vehicle includes a passenger compartment, and wherein the manual control element is configured to be operated from within the passenger compartment.

9. The apparatus of claim 7 wherein the vehicle includes a passenger compartment, and wherein the manual control element is configured to be operated from outside the passenger compartment.

10. The apparatus of claim 1 wherein the shift actuator includes a motor and a motor controller adapted to receive power from the storage device.

11. A shift by wire backup system for a vehicle, comprising:
    a transmission;
    a shift actuator;
    an electrical storage device; and
    an emergency generator that is manually cranked to charge the storage device to a level sufficient to execute only one shift event of the shift actuator, wherein the generator is configured to be operated from outside a passenger compartment of the vehicle.

* * * * *